United States Patent Office 3,265,697
Patented August 9, 1966

3,265,697
2-p-DIALKYLAMINOALKOXYPHENYL - 2,3 - DIHYDRO-4(1H)-QUINAZOLINONES AND THEIR DERIVATIVES
Edgar S. Schipper, Clifton, N.J., assignor to Shulton, Inc., Clifton, N.J., a corporation of New Jersey
No Drawing. Filed Sept. 4, 1964, Ser. No. 394,604
8 Claims. (Cl. 260—256.4)

This invention relates to 2-p-dialkylaminoalkoxyphenyl-2,3-dihydro-4(1H)-quinazolinones and their non-toxic salts.

The 2-p-dialkylaminoalkoxyphenyl-2,3-dihydro-4(1H)-quinazolinones of this invention are new compounds having the following formula:

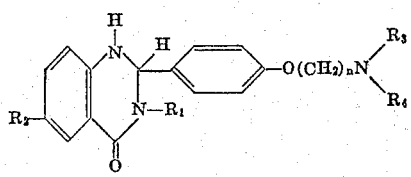

in which $R_1$ is hydrogen, lower alkyl, cycloalkyl, allyl, aralkyl, aryl or substituted aryl in which the substituent is lower alkyl or halogen; $R_2$ is hydrogen or halogen, $R_3$ and $R_4$ is hydrogen or lower alkyl and $n$ is a whole number from 1 to 3. Examples of lower alkyl are those containing less than 6 carbon atoms, such as methyl. An example of cycloalkyl is cyclopropyl, that of an aralkyl is homoveratryl, that of an aryl is phenyl and that of a substituted aryl is tolyl or chlorophenyl.

The compounds of this invention manifest central nervous system stimulant activity in mammals at dosages from 10 to 300 mg. per kg. of body weight. Such dosages are significantly lower than the respective $LD_{50}$ of such compounds.

The new 2-p-dialkylaminoalkoxyphenyl-2,3-dihydro-4(1H)- quinazolinones of this invention may be produced by reacting in the presence of a base, such as an alkali metal hydroxide, a substituted anthranilamide with the required aldehyde in accordance with the following reaction:

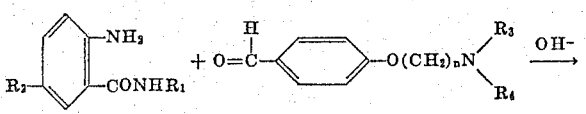

Non-toxic salts of the 2-p-dialkylaminoalkoxyphenyl-2,3-dihydro-4(1H)-quinazolinones of this invention are produced by mixing equimolecular amounts of the required 2-p-dialkylaminoalkoxyphenyl-2,3-dihydro-4(1H)-quinazolinones and the required acid in an inert solvent such as ether, ethanol, benzene or toluene, and subsequently filtering the precipitated salt or evaporating the solvent and recovering the salt residue. Salts of inorganic acid such as hydrochloric, sulfuric or phosphoric acid or salts of organic acids such as acetic, succinic, tartaric or ascorbic acid of the 2-p-dialkylaminoalkoxyphenyl-2,3-dihydro-4(1H)-quinazolinones may be produced in this manner.

A more comprehensive understanding of this invention is obtained by reference to the following examples:

*Examples 1–7*

2,3 - dihydro - 2 - p - β - diethylaminoethoxyphenyl - 6 - chloro-4(1H)-quinazolinone;
2,3 - dihydro - 2 - p - β - diethylaminoethoxyphenyl - 3 - allyl-4(1H)-quinazolinone;
2,3 - dihydro - 2 - p - β - diethylaminoethoxyphenyl - 3 - homoveratryl-6-chloro-4(1H)-quinazolinone;
2,3 - dihydro - 2 - p - β - diethylaminoethoxyphenyl - 3 - o-tolyl-4(1H)-quinazolinone;
2,3 - dihydro - 2 - p - β - diethylaminoethoxyphenyl - 3-p-chlorophenyl-4(1H)-quinazolinone;
2,3 - dihydro - 2 - p - β - diethylaminoethoxyphenyl - 3 - ethyl-6-chloro-4(1H)-quinazolinone;
2,3 - dihydro - 2 - p - β - diethylaminoethoxyphenyl - 3 - cyclopropyl-4(1H)-quinazolinone.

Each of the above 2-p-dialkylaminoalkoxyphenyl-2,3-dihydro-4(1H)-quinazolinones was prepared by refluxing for two hours a solution of 0.1 M (22.1 g.) of p-β-diethylaminoethoxybenzaldehyde in 100 ml. of ethanol and 0.1 M of the anthranilamide intermediate required and denoted in the following Table I. A solution of 80 ml. of 8% sodium hydroxide was added and the mixture was

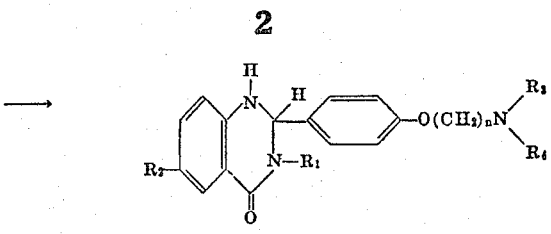

TABLE I

| Exa. | 2-P-dialkylaminoalkoxyphenyl-2,3-dihydro-4(1H)-quinazolinones produced | Anthranilamide intermediate used |
|---|---|---|
| 1 | 2,3-dihydro-2-p-β-diethylamino-ethoxyphenyl-6-chloro-4(1H)-quinazolinone. | 5-chloroanthranilamide. |
| 2 | 2,3-dihydro-2-p-β-diethylamino-ethoxyphenyl-3-allyl-4(1H)-quinazolinone. | 2-amino-N-allyl-benzamide. |
| 3 | 2,3-dihydro-2-p-β-diethylamino-ethoxyphenyl-3-homoveratryl-6-chloro-4(1H)-quinazolinone. | 2-amino-5-chloro-N-homoveratryl-benzamide. |
| 4 | 2,3-dihydro-2-p-β-diethyl-aminoethoxyphenyl-3-o-tolyl-4(1H)-quinazolinone. | 2-amino-N-o-tolyl-benzamide. |
| 5 | 2,3-dihydro-2-p-β-diethyl-aminoethoxyphenyl-3-p-chloro-phenyl-4(1H)-quinazolinone. | 2-amino-N-p-chloro-phenyl-benzamide. |
| 6 | 2,3-dihydro-2-p-β-diethyl-aminoethoxyphenyl-3-ethyl-6-chloro-4(1H)-quinazolinone. | 2-amino-5-chloro-N-ethylbenzamide. |
| 7 | 2,3-dihydro-2-p-β-diethyl-aminoethoxyphenyl-3-cyclo-propyl-4(1H)-quinazolinone. | 2-amino-N-cyclo-propylbenzamide. | heated on the steam bath for 5-30 minutes. The reaction product crystallized from the solution when it was placed in the refrigerator for 2-24 hours. The product was filtered off and recrystallized.

The following Table II shows the solvent used in recrystallization of the final product, the melting point, analysis of carbon, hydrogen and nitrogen, as calculated and found, and the percent yield of each of the 2-p-dialkylaminoalkoxyphenyl - 2,3 - dihydro - 4(1H) - quinazolinones produced by the practice of each of the examples.

TABLE II

| Example | Solvent Used in Recrystallization | M.P.,° C. | Analysis | | | | | | Yield, percent |
|---|---|---|---|---|---|---|---|---|---|
| | | | Calculated | | | Found | | | |
| | | | C | H | N | C | H | N | |
| 1 | Ethyl acetate | 185-186 | 64.25 | 6.47 | 11.24 | 64.39 | 6.69 | 11.12 | 72 |
| 2 | Ether | 122-124 | 72.79 | 7.70 | 11.07 | 73.06 | 7.75 | 11.28 | 98 |
| 3 | Ethyl acetate/hexane | 114-116 | 66.96 | 6.75 | 7.81 | 67.21 | 6.95 | 7.57 | 71 |
| 4 | Methanol | 190-191 | 75.49 | 7.27 | 9.78 | 75.49 | 7.39 | 9.87 | 76 |
| 5 | Ethyl acetate | 199-200 | 69.40 | 6.27 | 9.34 | 69.34 | 6.10 | 9.09 | 81 |
| 6 | do | 126-127 | 65.74 | 7.02 | 10.45 | 65.79 | 7.12 | 10.59 | 85 |
| 7 | do | 94-95 | 72.79 | 7.70 | 11.07 | 72.97 | 7.42 | 10.96 | 40 |

What is claimed is:

1. A compound selected from the class consisting of 2-p-dialkylaminoalkoxyphenyl - 2,3 - dihydro-4(1H)-quinazolinones and non-toxic acid addition salts thereof, said 2-p-dialkylaminoalkoxyphenyl - 2,3 - dihydro-4(1H)-quinazolinones having the formula:

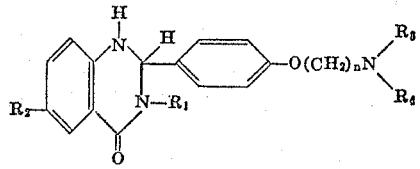

in which $R_1$ is selected from the group consisting of hydrogen, lower alkyl, cyclo lower alkyl, allyl, homoveratryl, phenyl and substituted phenyl in which the substituent is selected from the group consisting of lower alkyl and halogen; $R_2$ is selected from the group consisting of hydrogen and halogen; $R_3$ and $R_4$ are selected from the group consisting of hydrogen and lower alkyl; and $n$ is a whole number from 1 to 3.

2. 2,3 - dihydro - 2 - p - β - diethylaminoethoxyphenyl-6-chloro-4(1H)-quinazolinone.

3. 2,3 - dihydro - 2 - p - β - diethylaminoethoxyphenyl-3-allyl-4(1H)-quinazolinone.

4. 2,3 - dihydro - 2 - p - β - diethylaminoethoxyphenyl-3-homoveratryl-6-chloro-4(1H)-quinazolinone.

5. 2,3 - dihydro - 2 - p - β - diethylaminoethoxyphenyl-3-o-tolyl-4(1H)-quinazolinone.

6. 2,3 - dihydro - 2 - p - β - diethylaminoethoxyphenyl-3-p-chlorophenyl-4(1H)-quinazolinone.

7. 2,3 - dihydro - 2 - p - β - diethylaminoethoxyphenyl-3-ethyl-6-chloro-4(1H)-quinazolinone.

8. 2,3 - dihydro - 2 - p - β - diethylaminoethoxyphenyl-3-cyclopropyl-4(1H)-quinazolinone.

References Cited by the Examiner

Bohme et al., Archiv der Pharm., vol. 293, No. 11, 1960, pages 1011–1020.

Elderfield, Heterocyclic Compounds, vol. 6, New York, John Wiley & Sons, Inc., page 346.

HENRY R. JILES, *Acting Primary Examiner.*

MARY E. O'BRIEN, *Assistant Examiner.*